United States Patent [19]

Roy et al.

[11] 4,452,095
[45] Jun. 5, 1984

[54] OVERLOAD PROTECTION FOR METAL FORMING MACHINE

[75] Inventors: Donald A. Roy, Waterbury; Albert M. Garms, Oakville, both of Conn.

[73] Assignee: Waterbury Farrel Div. of Textron, Inc., Providence, R.I.

[21] Appl. No.: 354,542

[22] Filed: Mar. 4, 1982

[51] Int. Cl.³ .................... F16H 57/00; F16H 1/02
[52] U.S. Cl. .................. 74/412 TA; 464/32; 464/33; 74/405
[58] Field of Search ............ 464/32, 33; 74/412 TA, 74/405

[56] References Cited

U.S. PATENT DOCUMENTS

| | | | |
|---|---|---|---|
| 1,972,601 | 9/1934 | Regan | 464/33 |
| 2,652,914 | 9/1953 | Christensen | 464/33 |
| 3,101,322 | 8/1963 | Stallman et al. | 464/32 |
| 3,103,004 | 9/1963 | Murray | 464/33 |
| 3,220,218 | 11/1965 | Rio et al. | 464/33 |
| 3,236,106 | 2/1966 | Krupp et al. | 464/33 |
| 3,237,741 | 3/1966 | Potter et al. | 464/32 |
| 3,369,387 | 2/1968 | Bradlee | 72/405 |
| 3,380,264 | 4/1968 | Moore | 464/32 |
| 4,186,570 | 2/1980 | Pokrandt | 464/33 |
| 4,318,304 | 3/1982 | Lang | 74/412 TA |

FOREIGN PATENT DOCUMENTS 55-83545  6/1980 Japan ..................... 464/33

Primary Examiner—Lawrence J. Staab
Assistant Examiner—Michael David Bednarek
Attorney, Agent, or Firm—DeLio and Libert

[57] ABSTRACT

A metal forming machine for forming articles from metal workpieces has a plurality of driven members for performing work on the metal workpieces. A drive shaft is connected with the driven members for transferring force to the driven members. A frangible portion is connected in the drive shaft and is designed to fail upon the occurrence of a predetermined overload at the member being driven from the drive shaft. A signalling device is associated with the frangible portion to stop the machine and give an alarm when an overload occurs which breaks the frangible portion.

7 Claims, 4 Drawing Figures

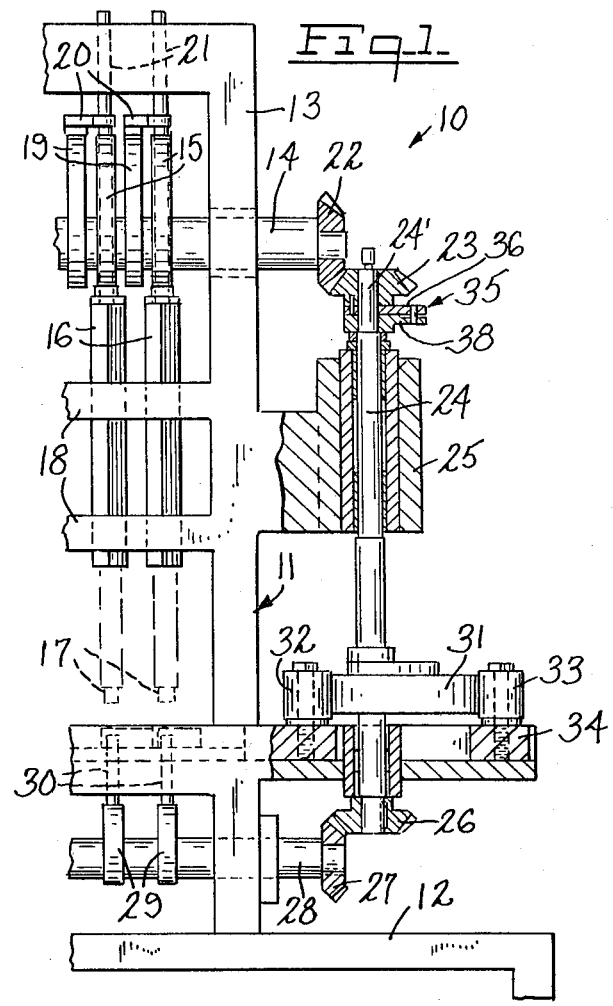
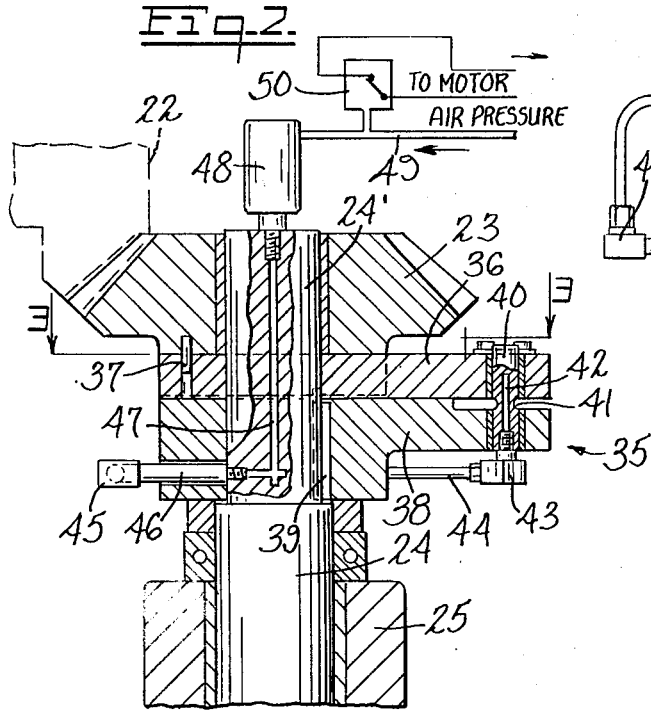
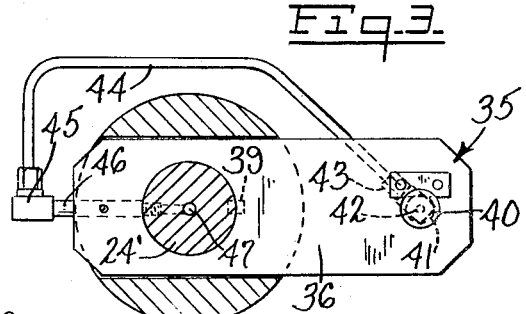
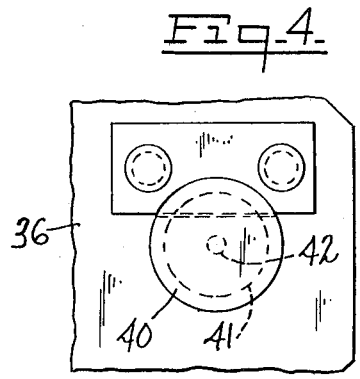

OVERLOAD PROTECTION FOR METAL FORMING MACHINE

BACKGROUND OF THE INVENTION

1. Field of the Invention

This invention relates generally to metal forming machines, and more particularly, relates to multiple plunger power presses such as cam eyelet machines and the like, suitable for automatically producing shells and other formed parts. The invention represents an improvement over prior U.S. Pat. No. 3,369,387.

A cam eyelet machine is utilized to shape metal blanks by such consecutive operations as drawing, bottom or side piercing, fluting, flange flattening, resizing, dimpling, clipping, etc. Special devices can also be added to permit the accomplishment of such operations as lettering, heading, and threading. Generally, the metal blanks, which are shaped by the machine, are cut by the machine from a strip of metal fed from a reel. The reel is usually positioned in front of the first or blanking plunger so that the strip passes directly over the blanking die through a roll feed and is finally wound on a scrap reel at the rear of the machine.

2. Prior Art

A cam eyelet machine, as disclosed in U.S. Pat. No. 3,369,387, for example, includes a first cam shaft 60 connected to be driven through a series of belts and pulleys from a motor 50. A transfer shaft or side shaft 71 is engaged through bevelled gears 70A and 70B with the first cam shaft 60, to be driven at one end from the first cam shaft, and has a bevel 73A on its other end engaged with a corresponding bevel gear 73B on a second cam shaft 65, to drive the second cam shaft. Additionally, the side shaft or transfer shaft 71 has a cam 93 between its ends for cooperation with transfer slide 90 which is reciprocable in frame 11. Side shaft 71 carries the load of the transfer mechanism, the blank hold down load and the knock-up or knockout load. In the event any of these loads exceeds a certain stress, severe damage can occur to the machine.

SUMMARY OF THE INVENTION

Accordingly, it is a principal object of this invention to provide a means for avoiding damage to machines of the type described above, due to overload.

A more specific object of the invention is to provide protection against overload damage to power presses or the like by interposing a frangible portion between the drive means and driven means.

Another object of the invention is to provide an overload protection device for metal forming machines wherein a frangible member is provided in the drive train of the machine and breaks upon the load exceeding a predetermined value, and a signalling means is connected with the frangible portion to produce a signal upon breakage which is operative to cause stopping of the machine.

Generally, the invention provides, in an article forming machine having a drive train comprising driven means for forming articles and a drive means connected with the driven means to drive the driven means, the following improvement. A frangible member is provided in the drive train and breaks upon the occurrence of a predetermined overload in the driven means. Signalling means are operatively associated with the frangible member and are operative, upon breaking of the frangible member, to emit a signal operative to stop the machine.

The frangible member may comprise a shear pin and may be located in the drive means. The signalling means may comprise a fluid pressure means which includes a fluid pressure passage in the shear pin, whereby breakage of the shear pin results in rupture of the fluid pressure passage and the resultant pressure change provides the signal to stop the machine. The fluid pressure means may be a pneumatic system, e.g., the fluid may be compressed air.

In accordance with certain other aspects of the invention, a pressure responsive switch may be connected with the fluid pressure passage and adapted to sense a change in pressure when the passage is ruptured upon breakage of the frangible member, e.g., the shear pin. The fluid pressure switch may be operatively connected with the machine to stop the machine when the shear pin is broken.

The overload protection device, comprises in a preferred embodiment, a pneumatic system and shear pin. The shear pin may have a necked-down portion and the pneumatic system includes a fluid passage extending into the shear pin and through the necked-down portion. Thus, if the shear pin breaks, it will fail in a plane across the necked-down portion, interrupting the fluid passage and enabling pressurized air to escape to the atmosphere. This drop in air pressure will actuate a pressure switch which in turn will signal the machine to stop. A warning signal, such as an audible and/or visual alarm, may also be triggered by the breaking of the frangible member.

BRIEF DISCRIPTION OF THE DRAWINGS

Referring to the drawings, preferred forms of the invention are illustrated, wherein like reference characters designate like parts throughout the several views, and wherein:

FIG. 1 is a fragmentary view, shown partly in section and partly in elevation, of a portion of a metal forming machine having the overload protection device in accordance with the invention;

FIG. 2 is an enlarged fragmentary sectional view of the overload protection device of the invention;

FIG. 3 is a horizontal sectional view taken along line 3—3 of FIG. 2; and

FIG. 4 is an enlarged, fragmentary plan view of a portion of the overload protection device of FIGS. 2 and 3.

DETAILED DESCRIPTION OF THE PREFERRED EMBODIMENT

A metal forming machine is indicated generally at 10 in FIG. 1 and comprises a frame 11 mounted on a pedestal 12. A first rotatable cam shaft 14 is supported in the upper portions 13 of the frame and has a plurality of cam lobes 15 thereon for operating plungers 16 and punches 17. The punches are guided by spaced guide plates 18 on the frame. The first cam shaft 14 also has a plurality of cam lobes 19 thereon for cooperating with lift plates 20 carring lift rods 21, as more fully described in the aforementioned U.S. Pat. No. 3,369,387, the disclosure of which is incorporated herein by reference.

A bevel drive gear 22 is carried by the end of cam shaft 14 projecting beyond the frame and the bevel gear is meshed with a driven bevel gear 23 carried by the upper end of a side shaft or transfer shaft 24 rotatably supported in a boss 25 projecting laterally from the frame portion 13. A bevel gear 26 on the lower end of transfer shaft 24 meshes with a complemental bevel gear 27 on the end of a second cam shaft 28 rotatably mounted in the lower portion of the frame. The second cam shaft 28 has a plurality of cam lobes 29 thereon which cooperate with a plurality of knock-out or knock-up pins 30 in a manner as more fully disclosed in the aforementioned U.S. Pat. No. 3,369,387. Further, a cam 31 is provided between the ends of the transfer shaft 24 for cooperation with a pair of cam followers 32 and 33 to operate a transfer slide 34 as more fully described in the aforementioned U.S. Pat. No. 3,369,387.

To protect the machine against damage caused by an overload occurring in the driven means, including the cam shaft 28 and transfer slide 34, a frangible shear pin 40 is connected between the driven bevel gear 23 and the shaft 24, as seen best in FIG. 2. The driven gear 23 is rotatable on the reduced diameter end 24' of shaft 24 and is fixed to an eccentric plate 36 by a drive fit between a slot in gear 23 and the plate 36, which is also rotatable on shaft 24. Pin 37 orients the teeth of gear 23 and plate 36 to maintain proper timing.

A second eccentric plate 38 is secured to the shaft 24 against relative rotation therebetween by means of a key 39 or other suitable fastening means. The shear pin 40 is engaged between the eccentric plates 36 and 38, such that rotation of gear 23 causes rotation of plate 36, and via shear pin 40, causes rotation of plate 38 and shaft 24.

A pneumatic system is connected with the shear pin 40 and includes a fluid passageway 42 extending axially through the pin from a fitting 43 to a point beyond the necked-down portion 41. A length of tubing or pipe 44 extends from the fitting 43 to a second fitting 45, which is connected through radially extending port or tube 46 with an axially extending passage 47 in the upper end of shaft 24. A fitting 48 is connected with the upper end of passage 47 and has a conduit 49 connected therewith in which a pressure switch 50 is mounted for sensing the pressure in the conduit 49. The pressure switch 50 is connected through suitable circuitry (not shown) to a drive motor (not shown) to de-energize the motor when the shear pin 40 is broken at the necked-down portion 41, thereby releasing the air pressure to atmosphere and operating the pressure responsive switch 50.

Accordingly, during normal operation, drive from the (motor driven) first rotatable cam shaft 14 is accomplished through the bevel gears 22 and 23 and thence through the eccentric plates 36 and 38 to the shaft 24, and the bevel gears 26 and 27 to cam shaft 28. However, should an overload exceed a predetermined value at either transfer slide device 34 or the second rotatable cam shaft 28, the shear pin 40 will fracture at the necked-down portion. This breaks the passageway 42 and exposes it to atmosphere releasing air pressure in the air pressure system and energizing or operating the switch 50. The signal thus produced can be used to stop the machine and/or provide a suitable alarm.

It will thus be seen that the objects set forth above, among those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

What is claimed is:
1. In an article forming machine having a drive train comprising driven means for forming articles, and a drive means connected with the driven means to drive the driven means, the improvement comprising:
   a frangible member in the drive train adapted to break upon the occurrence of a predetermined overload in the driven means; and
   signalling means operatively associated with the frangible member and operative upon breaking of the frangible member to stop the machine;
   the frangible member comprising a shear pin;
   the signalling means comprising a dead-end fluid pressure passage in the shear pin, means supplying fluid pressure to said passage, a fluid pressure responsive switch connected with the fluid pressure passage and adapted to be actuated by a change in pressure when the passage is ruptured upon breakage of the shear pin;
   the fluid responsive switch being operatively connected with the drive means of the machine to stop the machine when the shear pin is broken.
2. An article forming machine as in claim 1, wherein: the shear pin has a necked-down portion defining a fracture line, and the fluid pressure passage extends through the necked-down portion to ensure that breakage of the shear pin fracture section results in interruption of the fluid pressure passage.
3. An article forming machine as in claim 2, wherein:
   the drive train includes a rotatable transfer shaft and a drive gear connected on the transfer shaft to rotate the transfer shaft; and said frangible member is connected between the drive gear and the transfer shaft.
4. An article forming machine as in claim 3, wherein:
   the drive train includes a drive plate fixed to the drive gear and mounted eccentrically on the transfer shaft and a driven plate fixed to the transfer shaft and mounted eccentrically on the transfer shaft, and said shear pin is connected between the eccentric plates.
5. An article forming machine as in claim 4, wherein:
   the driven means includes a second rotatable shaft and gear means is connected between the transfer shaft and the second rotatable shaft.
6. An article forming machine as in claim 5, wherein:
   said drive means includes a first rotatable cam shaft having a bevel gear on one end thereof;
   said driven means includes a plurality of reciprocating knock-out pins;
   said transfer shaft has its axis perpendicular to the axis of the first cam shaft;
   said drive gear on the transfer shaft comprises a bevel gear meshed with the bevel gear on the first cam shaft for transferring force from the first cam shaft to the transfer shaft;
   said second rotatable shaft comprises a second cam shaft having its axis perpendicular to the axis of the transfer shaft; and
   said gear means comprises inter-engaged bevel gears on the transfer shaft and the second cam shaft for transferring force from the transfer shaft to the second cam shaft.
7. An article forming machine as in claim 1, wherein:
   said fluid pressure means comprises a pneumatic system.

* * * * *